United States Patent [19]
Trousdale

[11] 3,893,616
[45] July 8, 1975

[54] SPEED CONTROL FOR ELECTROMECHANICAL PLOTTERS

[75] Inventor: Robert B. Trousdale, Santa Ana, Calif.

[73] Assignee: California Computer Products, Inc., Anaheim, Calif.

[22] Filed: Nov. 23, 1973

[21] Appl. No.: 418,367

[52] U.S. Cl. ............ 235/151; 235/150.3; 318/571; 340/172.5
[51] Int. Cl.² ............ G06F 15/46; G05B 19/18
[58] Field of Search ............ 235/150.3, 151, 151.1, 235/151.11; 340/172.5; 318/571, 574, 596

[56] References Cited
UNITED STATES PATENTS

| | | | |
|---|---|---|---|
| ,344,260 | 9/1967 | Lukens II | 318/571 X |
| ,434,113 | 3/1969 | Wiley et al | 235/151 X |
| 3,544,972 | 12/1970 | Trousdale | 340/172.5 |
| 3,564,594 | 2/1971 | Montalto | 235/150.3 |
| 3,681,773 | 8/1972 | Russell et al | 318/571 X |
| 3,727,191 | 4/1973 | McGee | 340/172.5 |

*Primary Examiner*—Malcolm A. Morrison
*Assistant Examiner*—Jerry Smith
*Attorney, Agent, or Firm*—Bruce D. Jimerson

[57] ABSTRACT

The specification discloses a digital control device that extends the performance capability of digitally controlled electromechanical plotters by regulating the rate at which plot commands are transferred from the plot data source to the plotter. This invention regulates the velocity, the acceleration, and the rate of acceleration of the plotter in accordance with prescribed rate profiles that exploit the optimum response capability of the plotter.

9 Claims, 9 Drawing Figures

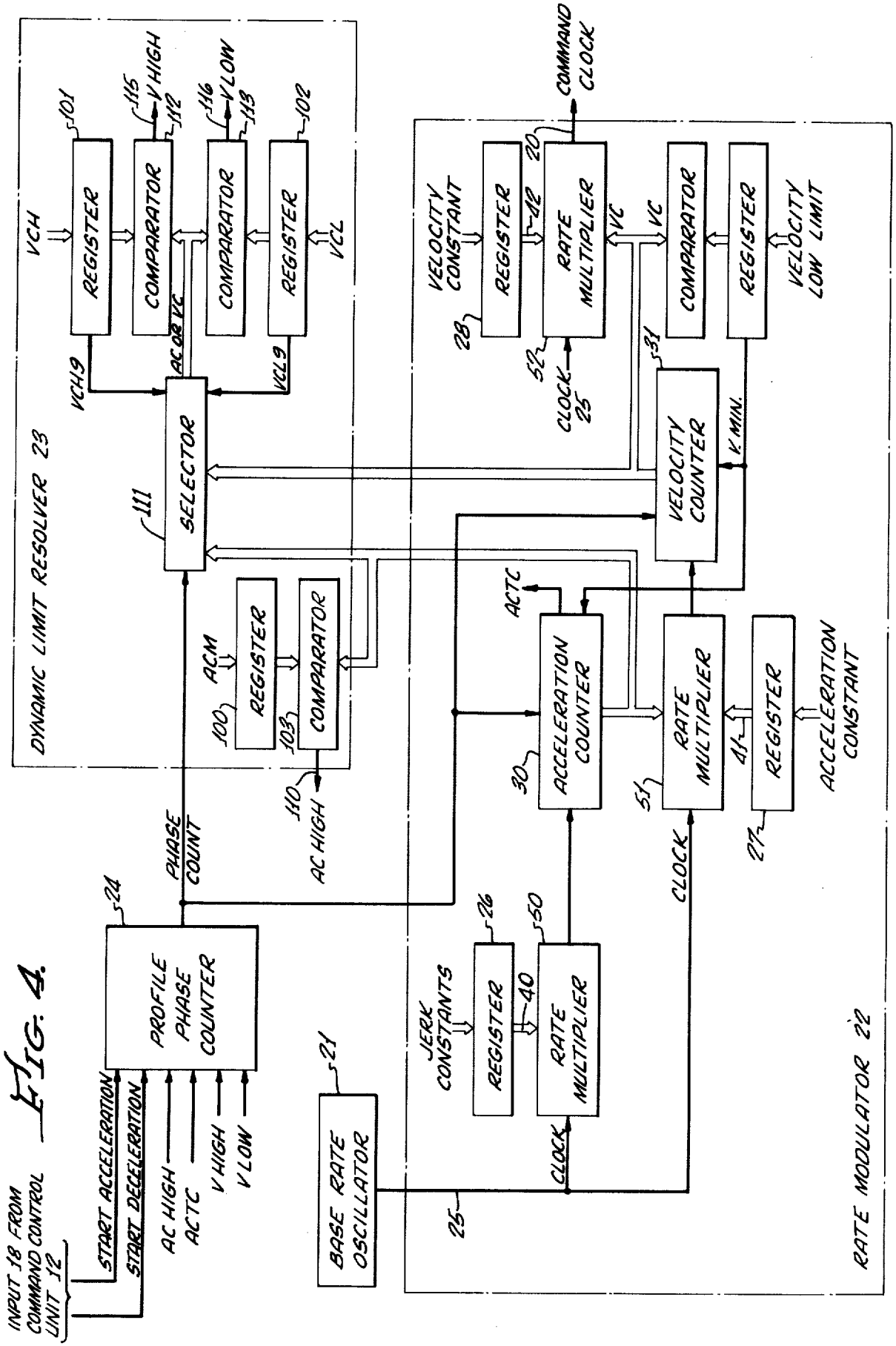

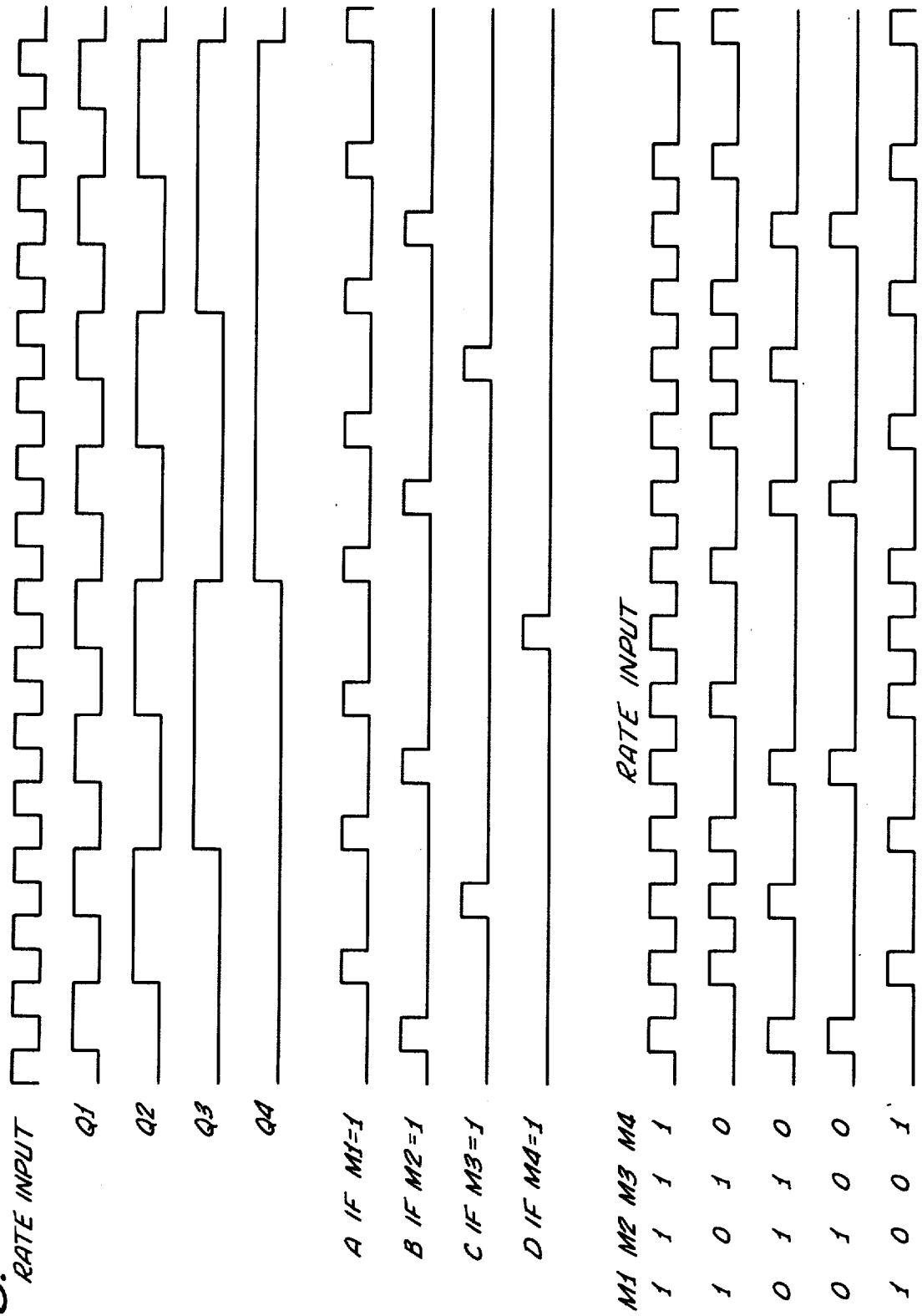

SPEED CONTROL FOR ELECTROMECHANICAL PLOTTERS

BACKGROUND OF THE INVENTION

The use of digitally controlled electromechanical plotters to display graphical information is well known in the art. The input data to a plotting device is in the form of a character word comprising a plurality of binary digits indicating, among other things, plot commands specifying the direction of each incremental movement of the attached plotting tool such as pens, scribes, or lightheads. The tool is usually moved one increment in response to each plot command. Since there is a one-for-one relationship between the plot rate and the distance the tool moves the command rate determines the speed at which the tool is driven. The overall plotting speeds of plotters can be optimized by driving plotting tools continually at the greatest rates of acceleration and velocity within the physical constraints of the plotter. To be able to accomplish this, the tool driving speeds must be fully controllable by the plot data source so that speed changes can be made in anticipation of upcoming situations while plotting. For example, in plotting series of successive straight lines (as described in U.S. Pat. No. 3,544,972), joined at varying angles, as in the case of approximating contouring lines, the speed of the plotting tool must be reduced prior to plotting an angle and by an amount proportional to the magnitude of the angle. The reduction in tool speed is necessary to keep the plotting tool from accelerating beyond optimum limits in changing its direction of travel. This close control of tool speeds provides great flexibility in optimizing speeds to fit every set of circumstance while plotting and thereby improving the overall average speed.

Since the moving parts of plotters are not perfectly rigid, measurable distortions occur under the stress of acceleration. The mechanical characteristics of the plotter and the effect these characteristics have on the quality of the plot determine the optimum acceleration of the plotter. Tests on several high-quality plotters indicate that the optimum acceleration can be raised substantially by avoiding sudden changes in the rate at which plot commands are sent to the plotter. This in effect means that the plotting tool must be eased into and out of acceleration when changing the velocity of the plotting tool - the same applies for deceleration.

SUMMARY OF THE INVENTION

The invention functions as an intermediary device between a plotter and its data source, and comprises a line generator that converts coordinate data into plot commands and a programmable rate control unit that clocks the plot commands, and consequently the speed of the plotter, at rates conforming to prescribed acceleration and velocity profiles. The programmable feature of the rate control unit makes it possible for the plot data source to modify velocity and acceleration profile parameters to accommodate different plotter and tool combinations and to make tool speed adjustments while plotting.

DESCRIPTION OF THE DRAWINGS:

FIG. 4 shows a functional block diagram illustrating the inter-relationship of the essential elements which comprise the invention.

FIG. 8 shows the wave-forms for the various blocks shown in FIG. 7.

Figure 1:
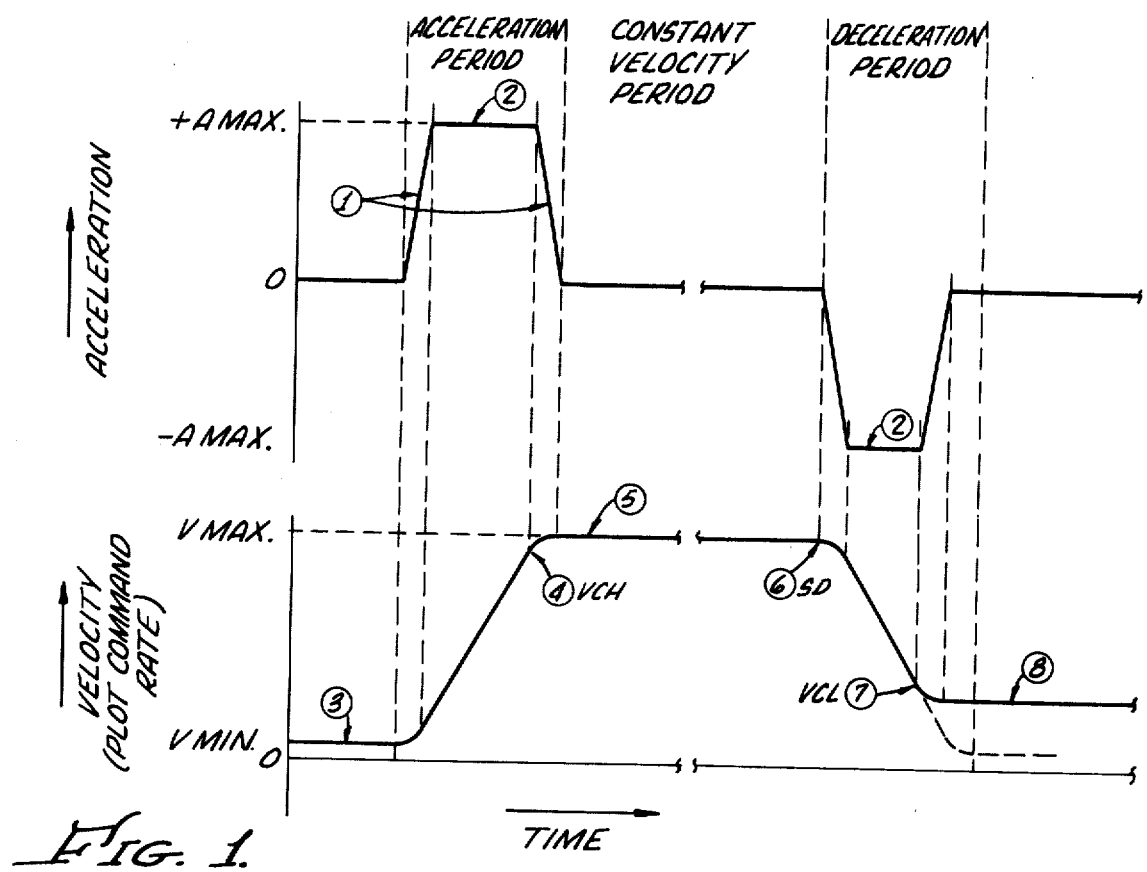
FIG. 1 shows the acceleration - velocity profiles as a function of time.

DETAILED DESCRIPTION OF A PREFERRED EMBODIMENT:

Adverting to the drawings, the preferred profile of the velocity at which tools should be driven is illustrated in FIG. 1, along with the acceleration and deceleration curves required to produce that profile. This invention rate modulates the plot commands in accordance with the velocity profile previously described. The programmable feature of this invention allows the plot data source to modify profile parameters. In reference to FIG. 1, the profile parameters that can be modified are those that control the slope of the acceleration and deceleration ramps 1, the maximum value of acceleration and deceleration 2, the minimum velocity 3, the velocity at which the acceleration decreases linearly to zero 4, the point at which the deceleration begins 6, and the velocity at which deceleration decreases linearly to zero 7. Profile parameters that control 1, 2 and 3 may be empirically derived and remain unchanged for given plotter and tool combinations. Minimum velocity 3, is the speed from which the plotting tool is able to stop suddenly or to reach suddenly from standstill. Profile parameters controlling 4, 6 and 7 are the variables that the plot data source can change to control tool speeds while plotting. The plot data source establishes the constant velocity level, 5, by sending the appropriate VCH value 4. Similarly, the VCL value 7 is sent to establish a lower constant velocity level 8. The SD value 6 is that distance from the end of a plotted line the tool must start decelerating to the lower velocity level. If SC is zero, the invention ignores VCL and maintains the constant velocity level established by VCH.

Figure 2:
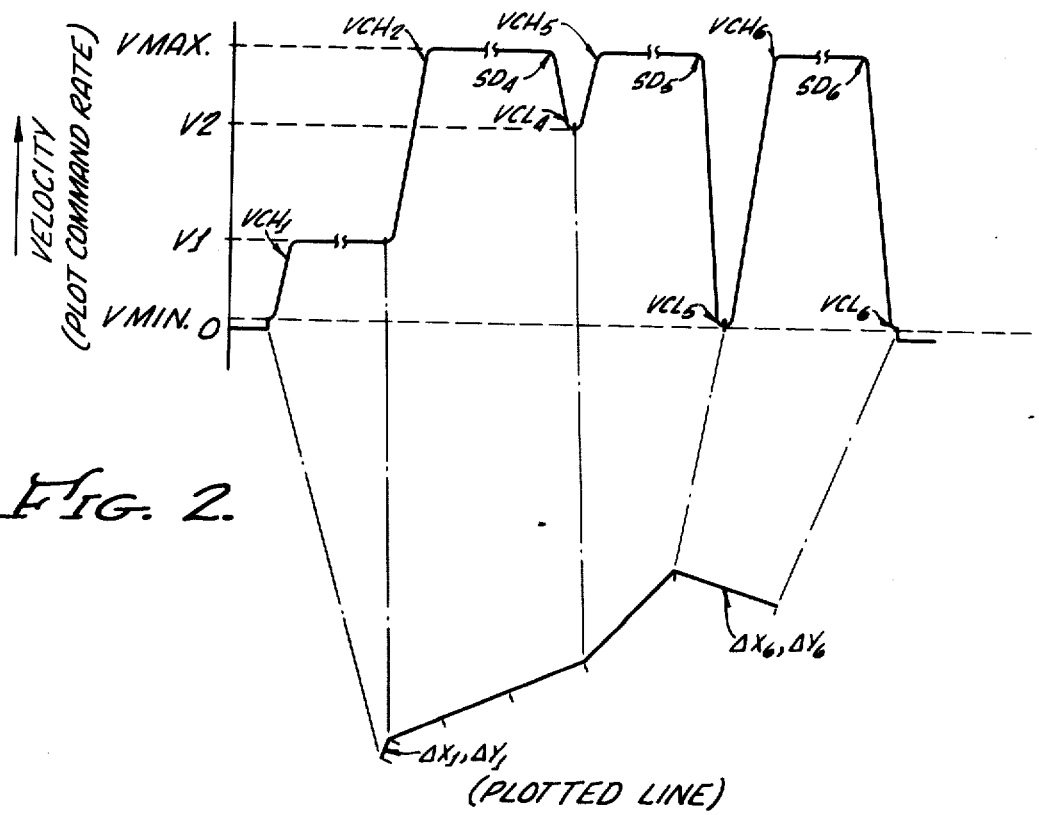
FIG. 2 shows the compounded velocity profile which corresponds to a typical plotting operation.

The plot data source sends the acceleration profile parameters at the beginning of a plot operation. The invention stores these parameters and maintains the same acceleration profile throughout the plotting operation. The velocity profile parameters, however, are sent along with each coordinate data to be plotted. FIG. 2 illustrates a simplified example of variations in the basic velocity profile for a plotted line consisting of six line segments. The profile parameters (VCH, SD, and VCL) setting the overall velocity profile are labeled on the velocity curve with subscript numbers corresponding to those line segments where speed adjustments are made. The first line segment which is very short requires a VCH value to establish a velocity just high enough for the tool to negotiate the first angle.

The VCH value for the second segment specified maximum velocity, causing the tool to be driven at maximum velocity through the second, third, and fourth line segments. The SD and VCL values for the fourth line segment reduce the velocity for the second angle, then VCH, SD, and VCL for the fifth line segment increases the velocity to maximum velocity and down to minimum velocity at the line segment in time for the last angle. Finally, the tool is driven back to maximum velocity and back to zero at the end of the sixth line segment. As illustrated in FIG. 1, overall average speeds of conventional plotters can be reduced considerably by driving plotting tools at maximum speeds as much as possible, only reducing speeds just long and low enough to meet the limits imposed by the physical constraints of the plotter.

Figure 3:
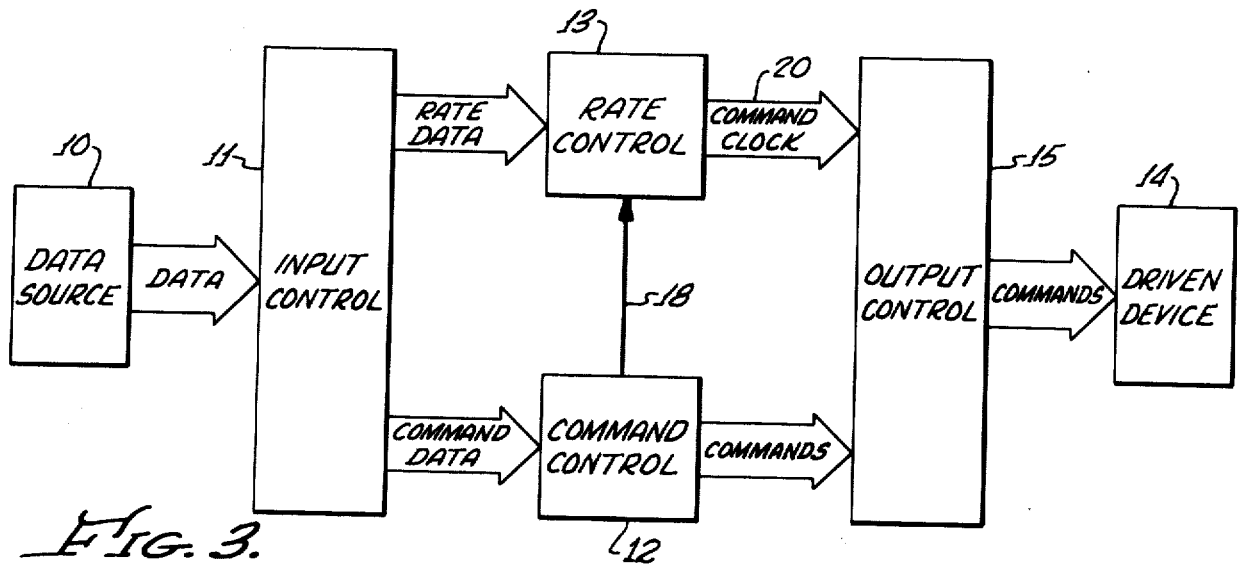
FIG. 3 shows a block diagram of the overall plotting system.

Referring now to FIG. 3, the overall system includes four major groups of circuits that perform the basic control functions required to drive an electromechanical plotter in accordance with the present invention. The digital data source 10 can be any device capable of supplying blocks of programmed data. An input control function 11 stores and buffers the transfer of all signals from the data source 10. The circuits that implement this function are conventional circuits, which perform routine tasks such as indicating to the data source when the next block of data can be supplied and storing data for transfer to other circuits. The command control unit 12 functions to transform source data into command sequences that direct the operation of the driven device 14. When the driven device 14 is a plotter, the command control unit 12 incorporates a conventional line generator such as that described in U.S. Pat. No. 3,544,972. Line generator circuits process coordinate data to generate a series of commands that direct a plotting tool along a given line segment. The command control unit 12 sends commands to the driven device 14 through an output control unit 15. The output control unit 15 incorporates conventional circuits that store and transfer all signals which are required to operate the driven device 14. The command control 12 also sends synchronizing signals, (via line 18) to a rate control unit 13, which provides a command clock that dispatches commands through the output control unit 15 at a programmed rate. The rate control unit which is the heart of the present invention, is described in succeeding paragraphs.

Referring to FIG. 4, the rate control unit 13 produces a command clock signal that determines the rate at which the output control unit 15 transfers commands to the driven device 14. The command clock on line 20 is a pulse sequence that varies in frequency according to a pattern prescribed by input rate constants. The rate control unit comprises four groups of circuits: a base-rate oscillator 21, a rate modulator 22, a dynamic limit resolver 23, and a profile phase counter 24.

The base-rate oscillator produces a digital clock signal on line 25 that synchronizes all the sequential operations of this invention except for the operations synchronized by the data source, (i.e., the data source 10 provides a clock and strobe signal for all input data transfer to the input control function). The output of the base-rate oscillator 21, which is designated as the clock, is typically on the order of $2^{12}$ pulses per millisecond. The rate modulator 22 varies the clock rate in three successive stages. The first rate change is the jerk rate (rate of change of acceleration), the second is the acceleration and the third is the velocity. The command clock output (line 20) then varies at a prescribed velocity rate, which the driven device integrates mechanically to a corresponding distance. Registers 26–28 in the rate modulator store constants supplied by the data source for each of these rates. The modulated rate varies in time in accordance with changes reflected by an acceleration counter 30, and a velocity counter 31. The parallel outputs 40, 41 and 42 of the jerk, acceleration and velocity constant registers 26, 27 and 28 and the two counters 30 and 31 modulate the serial clock 25 via three rate multipliers 50, 51 and 52 respectively.

Figure 7:
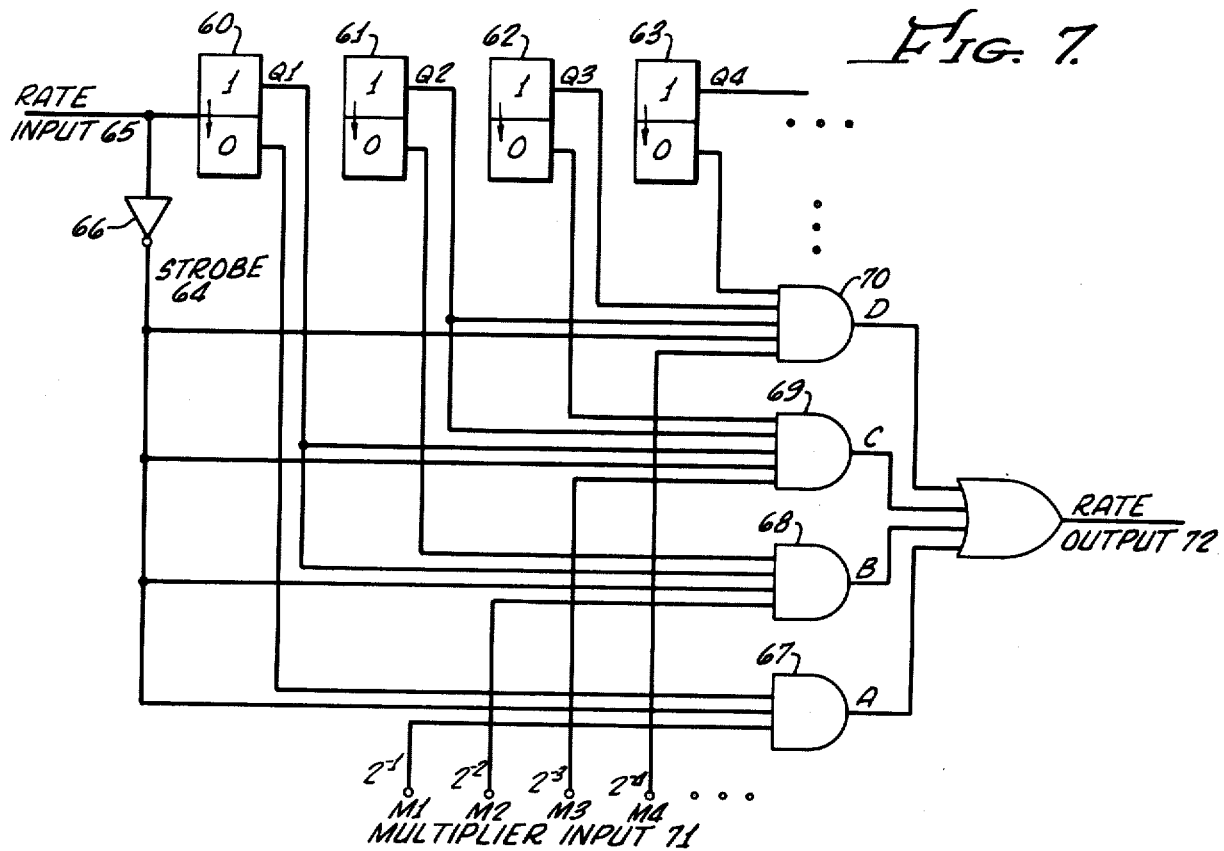
FIG. 7 shows a simplified block diagram of a rate multiplier.
Figure 9:
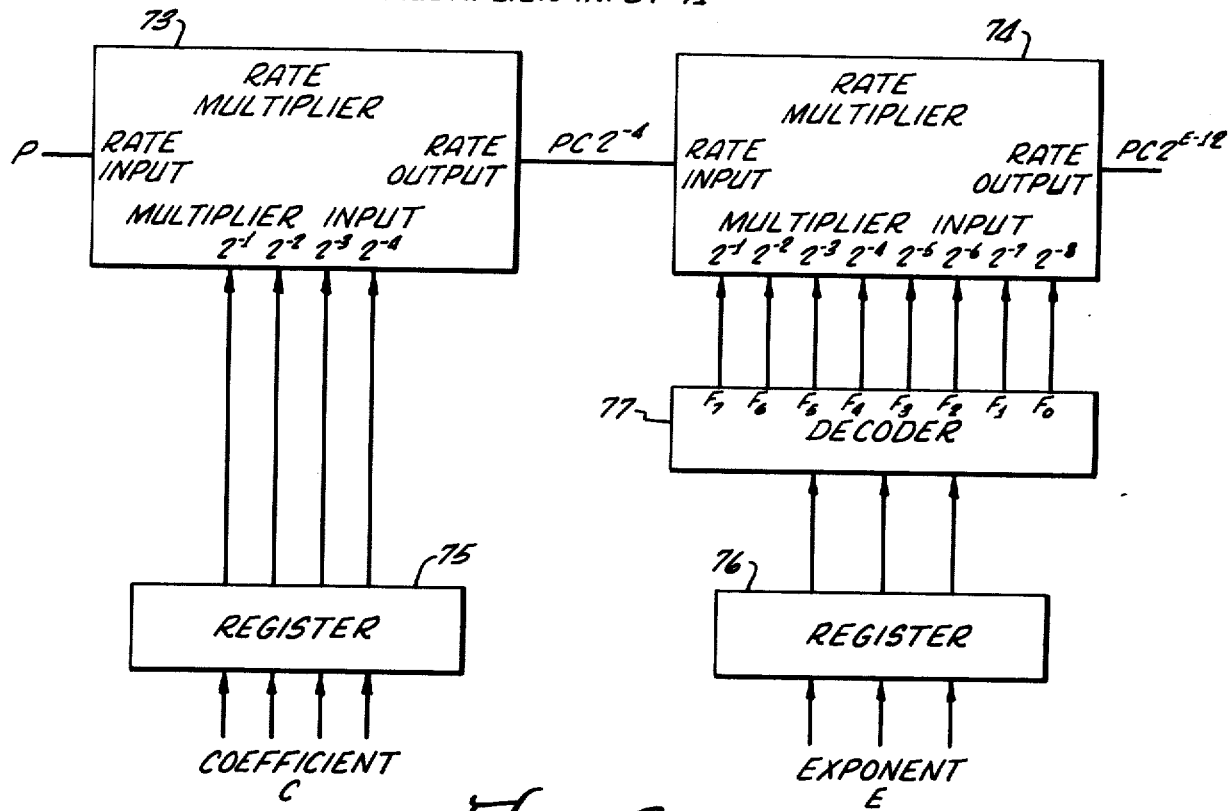
FIG. 9 shows a preferred embodiment, in block diagram form, of a rate multiplier which minimizes the effect of jitter.

The rate multiplier multiplies a serial pulse train by a binary fraction. The product is a serial pulse train with fewer pulses in a given time interval. FIG. 7 illustrates a simplified circuit of a rate multiplier, and FIG. 8 illustrates waveforms associated with that circuit. The four flip-flops 60 through 63 shown in FIG. 7 form a modulo 16 binary counter. Rate input 65 clocks the counter and supplies an output strobe 64 through inverter 66 to output gates 67 through 70. Each of the 4 bits of multiplier input 71 supplies an enable or inhibit level to one of the output gates. The most significant bit of the multiplier input, M1, has a binary weight of 1/2, and the weight of each succeeding bit decreases by a factor of 1/2 to form a binary fraction. Rate output 72 is the logic sum of A, B, C, and D, which represent the output of gates 67 through 70 respectively. FIG. 8 shows waveforms for one complete cycle of the counter and five rate output waveforms corresponding to representative multiplier inputs M1 through M4. The rate output examples show that the distribution of pulses along the time axis can be very irregular. In fact, the rate multiplier invariably introduces pulse pattern irregularities unless the multiplier input has only a single bit high. The uneven distribution of output pulses, which is a characteristic of bit rate multipliers, has an effect that is commonly known as jitter. The amount of jitter limits the useful resolution that can be achieved in digital processing. However, the preferred rate multiplier configuration illustrated in FIG. 9 reduces the characteristic jitter and extends the effective range of a multiplier with a limited number of bits. FIG. 9 shows two rate multipliers 73 and 74 cascaded to perorm successive multiplication with a two-part multiplier. The size of rate multipliers 73 and 74 are chosen to facilitate illustration, it being understood that the rate multipliers could have any number of stages, corresponding to the number of multiplier input terminals. The two-part multiplier number stored in registers 75 and 76 consists of a 4-bit coefficient, C, and a 3-bit exponent, E. Register 75 transfers C to the multiplier input terminals of rate multiplier 73 in the conventional manner so that C multiplies rate input signal P to produce a rate output signal equal to $(P)(C)(2^{-4})$. Register 76 transfers E to decoder 77, which transfers the decoded representation of E to one of eight output lines F0–F7. The output line that represents the octal value of E goes high while all others remain low. Successive output lines from decoder 77 connect to successive input terminals on rate multiplier 74 in corresponding order of significance. The exponential part of the multiplier then has a value of $2^E$ times $2^{-8}$, which equals $2^{E-8}$. Multiplication then produces a rate output equal to $(P)(C)(2^{E-12})$. In this configuration, E has a smoothing effect on both P and C. By scaling the product, the preferred configuration reduces the numerical weight of preceding pulse patterns, thereby minimizing jitter. Sets of rate multipliers in this configuration form the composite rate multipliers 50, 51 and 52 illustrated in FIG. 4.

The rate multiplier 50 multiplies the clock input successively by a linear jerk constant and an exponential jerk constant to provide a serial jerk rate output. The jerk rate signal advances an acceleration counter at a constant rate. The acceleration counter counts up or down, depending on the phase count supplied by a profile phase counter, which is described in a subsequent paragraph.

The acceleration counter supplies the profile phase counter a signal, ACTC, that indicates when the acceleration count, AC, reaches zero. The same signal inhibits the counter from counting beyond its minimum or maximum limit. The acceleration counter counts up and down alternately during odd-numbered phase counts, remaining constant during even-numbered phase counts. Rate multiplier 50 is cleared during the even numbered phase counts to prevent the accumulation of residue counts. Rate multiplier 51 multiplies the result by an acceleration constant, which is an exponential scale factor. Rate multiplier 51 is cleared during profile phase intervals in which the velocity count remains constant. The scaled acceleration rate product steps a velocity counter at a rate that is directly proportional to the magnitude of the acceleration count. The velocity counter, which is initially preset to a programmed velocity low limit at the same time that the constant is loaded into the velocity low limit register, counts up or down according to the state of the profile phase counter. The output of a comparator that compares the velocity count, VC, with the velocity low limit prevents the counter from counting down below that limit. If the acceleration count has not reached its low limit, the output of the low limit comparator forces the acceleration counter to go to zero at the clock rate. Rate multiplier 52 multiplies the clock by the velocity count and multiplies the result by a velocity constant, which is an exponential scale factor. The scaled velocity product is the command clock output of the rate modulator.

Figure 5:
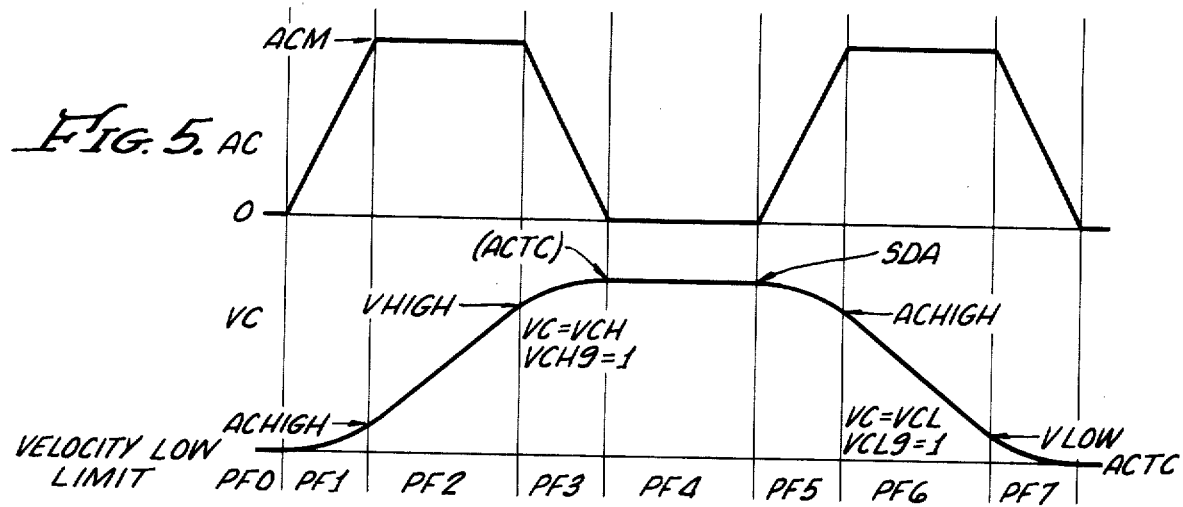
FIG. 5 shows diagrammatically the indexing of the profile phase counter with velocity controlling the dynamic limits.
Figure 6:
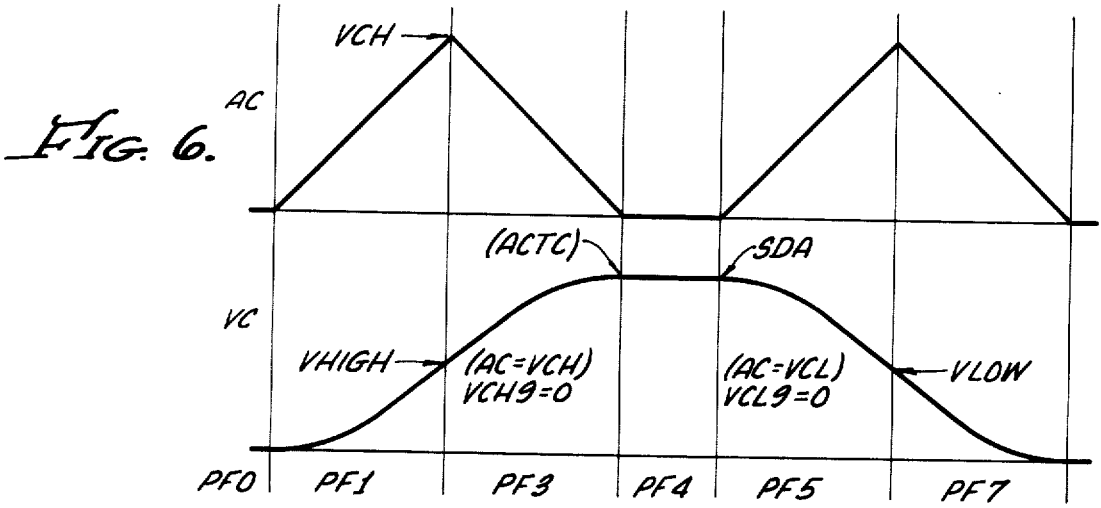
FIG. 6 shows diagrammatically the indexing of the profile phase counter with acceleration controlling the dynamic limits.

The dynamic limit resolver 23 compares acceleration and velocity counts with programmed constants to generate signals that step the profile phase counter 24. The profile phase counter indexes the eight phases, PFO through PF7, of the acceleration and velocity profiles shown in FIGS. 5 and 6. As described below, the sequence of phases can vary according to programmed conditions and phases PF2 and PF6 can be reduced to a single clock period. Three registers 100, 101 and 102 store the maximum acceleration constant, ACM, and the high and low velocity control constants, VCH and VCL. The comparator 103 compares the acceleration count AC with the ACM constant to generate ACHIGH (that is, the ACHIGH line 110 goes to a logic 1) when AC equals ACM. A control bit supplied with each velocity constant (bit VCH9 with VCH and bit VCL9 with VCL), determines whether the concomitant velocity constant is to be compared with the velocity count (control bit high) or with the acceleration count (control bit low). This option allows the programmer to select either count for optimum resolution. A profile phase count selector 111 selects control bit VCH9 or VCL9 on alternate sides of the velocity profile as illustrated in FIGS. 5 and 6, and the control bit selects AC or VC for comparison with VCH and VCL, vis a vis comparators 112 and 113. Dynamic limit signals VHIGH and VLOW are generated on lines 115 and 116 and occur at specified acceleration or velocity counts as follows:

if VCH9 = 0, VHIGH = 1 when AC = VCH;
if VCH9 = 1, VHIGH = 1 when VC = VCH;
if VCL9 = 0, VLOW = 1 when AC = VCL;
if VCL9 = 1, VLOW = 1 when VC = VCL.

The profile curves illustrated in FIGS. 5 and 6 represent profiles which emphasize a change in acceleration and deceleration which are normally very short time wise compared to the constant acceleration portions. The slope of the acceleration curve is a function of the jerk rate. The slope of the velocity curve is a function of the acceleration count. A start acceleration signal from the command control unit 12 starts the profile sequence by advancing the counter 24 from PF0 to PF1. During PF0, the acceleration count is 0 and the velocity count is at its low limit. During PF1, AC increases at a constant rate and VC increases at an accelerated rate until AC equals ACM, and ACHIGH advances the counter to PF2. During PF2, AC remains constant and VC increases at a constant rate until VHIGH advances the counter to PF3. During PF3, AC decreases to zero as VC increases at a diminishing rate toward its maximum value. ACTC advances the counter to PF4, the constant-velocity phase, when AC reaches zero. VC remains at its maximum value during PF4. Another start acceleration signal from the command control unit 12 will return the counter to PF1 to repeat the acceleration sequence and raise the velocity count; otherwise, AC remains at 0 and VC remains constant until the command control unit supplies a start decelerate signal, SDA. SDA advances the profile phase counter to PF5, which increases AC at a constant rate and decreases VC at a corresponding acceleration rate until AC reaches ACM to generate ACHIGH again. ACHIGH advances the counter to PF6. AC then remains constant as VC decreases at a constant rate until VC equals VCL, which generates VLOW if control bit VCL9 is high. VLOW advances the counter to PF7, which returns AC to 0 at a constant rate and VC to a low limit at a diminishing rate. The low limit need not be as indicated in FIG. 5. Raising VCL generates VLOW sooner, causing VC to slow down and stop at some constant value that is higher than the velocity low limit. Instead of sending a start decelerate signal, the command control unit 12 can return the profile sequence to PF1 with a start accelerate signal during PF4 to repeat the acceleration sequence. This compounds the velocity profile as illustrated in FIG. 2, that is, VC rises from its constant value established by PF4 as it did from its previous low limit, and a new value of VCH establishes a higher limit for VHIGH). The acceleration count as previously described can be used in place of the velocity count to generate VHIGH and VLOW if the velocity count does not get high enough to provide sufficient resolution, which can occur while using a very low jerk rate. In this case, (illustrated in FIG. 6), AC is compared with VCH and VCL to establish the high and low limits of the velocity profile, and PF2 and PF6 are reduced to 1 clock period, which is not illustrated, because the acceleration counter never reaches its steady state (constant acceleration). The profile sequence is similar to the profile sequence described previously except that PF2 and PF6 are eliminated and VHIGH now starts the down count of the acceleration counter when AC equals VCH during the acceleration period or when AC equals VCL during the deceleration period. The profile can also be compounded as described earlier where the profile sequence consists of eight phases.

The basic concept of the invention is not limited to use with digital incremental plotters. It may find application in numerous other electromechanical devices such as electric controlled machine tools which are required to change speeds abruptly in response to external commands. Nor are the particular elements or combination of elements shown in the preferred embodiment, the only way of implementing the invention. Thus, although a preferred embodiment, and its application to particular devices, has been shown and described, it will be understood that the invention is not limited thereto and that numerous changes, modifications and substitutions may be made without departing from the spirit of the invention.

I claim:

1. A system for driving electromechanical devices comprising:
   a data source including a means for supplying data for modifying the velocity and acceleration profile parameters;
   an input control unit responsively connected to said data source including means for buffering and means for transferring signals from the data source;
   command control means responsively connected to said input control unit for transforming source data into command sequences;
   a rate control unit responsively connected to said input control unit and said command control means including a means for generating a variable command clock said rate control unit comprising:
   a base rate oscillator;
   velocity register means for storing a digital number which represents the scaling exponent portion of a velocity constant;
   means for holding the coefficient portion of the velocity constant;
   velocity rate multiplier means responsively connected to said base rate oscillator and said means for holding the velocity coefficient and velocity scaling exponent for multiplying the base rate oscillator output by the velocity scaling exponent and velocity coefficient so as to generate a command clock pulse rate profile which is proportional to the velocity parameters supplied by said data source;
   output control means responsively connected to said rate control unit and said command control means for transferring signals;
   means responsively connected to said output control means for producing a mechanical movement in response to the signals transferred by said output control means.

2. The apparatus recited in claim 1 wherein said means for holding the velocity coefficient comprises an up-down velocity counter.

3. The apparatus recited in claim 2 wherein said rate control unit includes:
   acceleration register means for storing a digital number which represents the scaling exponent portion of the acceleration constant;
   means for holding the coefficient portion of the acceleration constant;
   acceleration rate multiplier means responsively connected to said base rate oscillator and said acceleration register means and said means for holding the acceleration coefficient for multiplying the base rate oscillator output by the acceleration scaling exponent and acceleration coefficient so as to generate a command clock pulse rate profile which is proportional to the acceleration parameters supplied by said data source.

4. The apparatus recited in claim 3 wherein said up-down velocity counter is responsively connected to the output of said acceleration rate multiplier means whereby the velocity coefficient will be proportional to the integral of output of the acceleration rate multiplier means.

5. The apparatus recited in claim 4 wherein said means for holding the acceleration coefficient comprises an up-down acceleration counter.

6. The apparatus recited in claim 5 including:
   a 1st jerk register means for storing a digital number which represents the scaling exponent portion of the rate of change of acceleration;
   a 2nd jerk register means for storing a digital number which represents the coefficient portion of the rate of change of acceleration;
   jerk rate multiplier means responsively connected to said base rate oscillator and said 1st and 2nd jerk registers for multiplying the base rate oscillator output by the jerk scaling exponent and jerk coefficient so as to generate a command clock pulse rate profile which is proportional to the jerk parameters supplied by said data source.

7. The apparatus recited in claim 6 wherein said up-down acceleration counter is responsively connected to the output of said jerk rate multiplier means whereby the acceleration coefficient will be proportional to the integral of the output of the jerk rate multiplier means.

8. In an electromechanical plotter system of the type having a data source for supplying data in blocks and a command control unit for transforming data into command sequences, the improvement which comprises a profile phase control system which is responsively connected to the data source and command control unit, and includes:
   means for limiting the maximum velocity of the plotter in accordance with commands transmitted with each coordinate plot data;
   means for limiting the plotter acceleration rate in accordance with data transmitted at the beginning of a plotting operation and;
   means for varying the acceleration rate of plotter in accordance with data transmitted at the beginning of a plotting operation, said acceleration varying means comprising:
   a base rate oscillator;
   a 1st jerk register means for storing a digital number which represents the scaling exponent portion of the rate of change of acceleration;
   a 2nd jerk register means for storing a digital number which represents the coefficient portion of the rate of change of acceleration;
   jerk rate multiplier means responsively connected to said base rate oscillator and said 1st and 2nd jerk registers for multiplying the base rate oscillator output by the jerk scaling exponent and jerk coefficient so as to generate a command clock pulse rate profile which is proportional to the jerk parameters supplied by said data source.

9. In an electromechanical plotter system of the type having a data source for supplying data in blocks and a command control unit for transforming data into command sequences, the improvement which comprises a profile phase control system which is responsively connected to the data source and command control unit, and includes:

means for limiting the maximum velocity of the plotter in accordance with commands transmitted with each coordinate plot data and said means comprising:

a base rate oscillator;

velocity register means for storing a digital number which represents the scaling exponent portion of a velocity constant;

means for holding the coefficient postion of the velocity constant; and velocity rate multiplier means responsively connected to said base rate oscillator and said means for holding the velocity coefficient and velocity scaling exponent for multiplying the base rate oscillator output by the velocity scaling exponent and velocity coefficient so as to generate pulse rate profile which is proportional to the velocity parameters supplied by the data source.

* * * * *